US009961105B2

(12) United States Patent
Nanda et al.

(10) Patent No.: US 9,961,105 B2
(45) Date of Patent: *May 1, 2018

(54) SYSTEMS AND METHODS FOR MONITORING VIRTUAL NETWORKS

(71) Applicant: Symantec Corporation, Mountain View, CA (US)

(72) Inventors: Susanta K. Nanda, Los Angeles, CA (US); Yuqiong Sun, State College, PA (US)

(73) Assignee: Symantec Corporation, Mountain View, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/587,048

(22) Filed: Dec. 31, 2014

(65) Prior Publication Data
US 2016/0191545 A1  Jun. 30, 2016

(51) Int. Cl.
*H04L 29/06* (2006.01)
*H04L 12/26* (2006.01)

(52) U.S. Cl.
CPC .......... *H04L 63/145* (2013.01); *H04L 43/028* (2013.01); *H04L 43/062* (2013.01); *H04L 43/12* (2013.01); *H04L 63/0227* (2013.01); *H04L 63/1408* (2013.01); *H04L 63/20* (2013.01)

(58) Field of Classification Search
CPC ... H04L 63/145; H04L 63/0227; H04L 63/20; H04L 43/028; G06F 9/455
See application file for complete search history.

(56) References Cited

U.S. PATENT DOCUMENTS

| 7,808,897 | B1* | 10/2010 | Mehta | H04L 12/2602 370/230 |
| 8,565,108 | B1* | 10/2013 | Marshall | G06F 21/60 370/252 |
| 8,689,282 | B1 | 4/2014 | Oprea et al. | |
| 2012/0317566 | A1* | 12/2012 | Santos | G06F 9/45558 718/1 |

(Continued)

OTHER PUBLICATIONS

Susanta K. Nanda, et al; Systems and Methods for Scalable Network Monitoring in Virtual Data Centers; U.S. Appl. No. 14/614,819, filed Feb. 5, 2015.

(Continued)

*Primary Examiner* — Wasika Nipa
(74) *Attorney, Agent, or Firm* — FisherBroyles, LLP

(57) ABSTRACT

The disclosed computer-implemented method for monitoring virtual networks may include (1) identifying a virtual network containing at least one virtualized switching device that routes network traffic from a source port within the virtual network to a destination port, (2) providing, within the virtualized switching device, a set of software-defined network rules containing criteria for identifying packets having at least one predetermined property associated with a security policy, (3) intercepting, at the source port, a packet destined for the destination port, (4) determining that at least one characteristic of the packet satisfies at least one of the rules, and (5) in response to determining that the characteristic of the packet satisfies at least one of the rules, forwarding a copy of the packet to a virtual tap port that analyzes the packet for security threats. Various other methods, systems, and computer-readable media are also disclosed.

18 Claims, 8 Drawing Sheets

(56) References Cited

U.S. PATENT DOCUMENTS

| | | | |
|---|---|---|---|
| 2014/0029451 A1 | 1/2014 | Nguyen | |
| 2014/0115183 A1 | 4/2014 | Mitsunobu et al. | |
| 2014/0150081 A1 | 5/2014 | Cooley | |
| 2014/0229605 A1* | 8/2014 | Besser | H04L 43/12 709/224 |
| 2014/0317737 A1* | 10/2014 | Shin | H04L 63/1408 726/23 |
| 2016/0191545 A1 | 6/2016 | Nanda et al. | |

OTHER PUBLICATIONS

"Open source software for creating private and public clouds.", http://www.openstack.org/, as accessed Nov. 6, 2014, OpenStack, (Jul. 24, 2002).

McKeown, Nick et al., "OpenFlow: Enabling Innovation in Campus Networks", http://archive.openflow.org/documents/openflow-wp-latest.pdf, as accessed Nov. 6, 2014, (Mar. 14, 2008).

"Network packet", http://en.wikipedia.org/wiki/Network_packet, as accessed Nov. 6, 2014, Wikipedia, (Feb. 21, 2011).

"OSI model", http://en.wikipedia.org/wiki/OSI_model, as accessed Nov. 6, 2014, Wikipedia, (Jan. 13, 2004).

"What's Software-Defined Networking (SDN)?", https://www.sdxcentral.com/resources/sdn/what-the-definition-of-software-defined-networking-sdn/, as accessed Nov. 6, 2014, (2012).

"Software-defined networking", http://en.wikipedia.org/wiki/Software-defined_networking, as accessed Nov. 6, 2014, Wikipedia, (Nov. 11, 2012).

"Cloud computing", http://en.wikipedia.org/wiki/Cloud_computing, as accessed Nov. 6, 2014, Wikipedia, (Oct. 12, 2007).

"What is the difference between a modem/router/switch/WAP?", http://whirlpool.net.au/wiki/dsl_modems03_01, as accessed Nov. 6, 2014, (On or before Nov. 6, 2014).

"VCloud Director", http://www.vmware.com/products/vcloud-director, as accessed Nov. 6, 2014, VMware, Inc., (Aug. 31, 2010).

\* cited by examiner

Software-Defined Network Rules
212

| PROPERTY TYPE | PROPERTY |
|---|---|
| Destination MAC Address | 00-16-22-01-25-43 |
| Source MAC Address | 00-0B-95-9A-59-17 |
| Destination IP Address | 766.11.219.55 |
| Source IP Address | 54.395.196.74 |
| Protocol Type | IPv4 |

*FIG. 5*

SYSTEMS AND METHODS FOR MONITORING VIRTUAL NETWORKS

BACKGROUND

Network monitoring may provide a basis for a variety of security services, such as Intrusion Detection Systems (IDS) and Data Loss Prevention (DLP) services. Security administrators and enterprises may monitor physical network connections in a variety of ways, such as by directly tapping network cables or by placing wiretap mechanisms within network devices. Such wiretap mechanisms may be designed to monitor and/or record data handled by specific ports within switches, routers, and other network devices.

Unfortunately, traditional methods for monitoring physical networks may be ineffective and/or unusable when applied to virtual networks. For example, virtual network connections may not have physical wires on which to place a tapping mechanism. In addition, a virtual network device may not correspond to or map to any physical network device. As a result, the virtual network device may be incompatible with network monitoring techniques designed for certain physical devices.

Furthermore, conventional methods for monitoring virtual ports may be unable to effectively monitor heavy flows of network traffic, such as the network loads within cloud-computing environments. For example, a virtual network device may facilitate access to large numbers of ports compared to physical network devices. As the size of cloud-based platforms grow, traditional virtual port-based filters (that may be based on physical filtering mechanisms) may increasingly be unable to efficiently and accurately detect security threats. Therefore, the current disclosure identifies a need for improved systems and methods for monitoring virtual networks.

SUMMARY

As will be described in greater detail below, the instant disclosure describes various systems and methods for monitoring virtual networks by identifying, at a virtualized switching device within a virtual network, a packet that contains one or more properties associated with a security policy. A copy of the packet may then be forwarded to a virtual tap port that analyzes the packet for security threats.

In one example, a computer-implemented method for monitoring virtual networks may include (1) identifying a virtual network containing at least one virtualized switching device that routes network traffic from a source port within the virtual network to a destination port, (2) providing, within the virtualized switching device, a set of software-defined network rules containing criteria for identifying packets having at least one predetermined property associated with a security policy, (3) intercepting, at the source port, a packet destined for the destination port, (4) determining that at least one characteristic of the packet satisfies at least one of the rules, and (5) in response to determining that the characteristic of the packet satisfies at least one of the rules, forwarding a copy of the packet to a virtual tap port that analyzes the packet for security threats.

In some examples, identifying the virtual network may include identifying the virtual network from within a plurality of virtual networks hosted in a cloud-computing environment. In these examples, each virtual network may be associated with a different tenant. Accordingly, in these examples, providing the set of software-defined network rules may include receiving the set of software-defined network rules from the tenant associated with the virtual network.

In some embodiments, the predetermined property associated with the security policy may include a property of a destination and/or a source of the packets. Additionally or alternatively, the predetermined property associated with the security policy may include a property of a protocol used to route the packets.

In some examples, the virtualized switching device may represent a virtualized edge switching device that connects the source port to both additional ports within the virtual network and to ports outside the virtual network. In one example, the destination port may reside within the virtual network. In this example, the security policy may include a malware detection policy applied to network traffic distributed to the destination port from outside the virtual network. In another example, the destination port may reside outside of the virtual network. In this example, the security policy may include a DLP policy applied to network traffic distributed from the source port to outside the virtual network.

In some embodiments, forwarding the copy of the packet to the virtual tap port may include forwarding the copy of the packet to a virtual port that resides outside of the virtual network. In this way, the analysis of the copy of the packet may be invisible to a tenant of the virtual network.

In some examples, the method may further include determining, based on an analysis of the copy of the packet at the virtual tap port, that the packet represents a security threat. In these examples, the method may then include performing at least one security action in response to determining that the packet represents the security threat.

In some embodiments, the method may further include intercepting, at the source port, an additional packet that contains at least one property that satisfies at least one of the software-defined network rules. The method may then include determining, based on additional criteria within the set of software-defined network rules, that the current network traffic load within the virtual network exceeds a predetermined threshold. In response to determining that the current network load exceeds the predetermined threshold, the method may include forwarding a copy of the additional packet to an additional virtual tap port instead of the virtual tap port.

In one embodiment, a system for implementing the above-described method may include (1) an identification module that identifies a virtual network containing at least one virtualized switching device that routes network traffic from a source port within the virtual network to a destination port, (2) a providing module that provides, within the virtualized switching device, a set of software-defined network rules containing criteria for identifying packets having at least one predetermined property associated with a security policy, (3) an interception module that intercepts, at the source port, a packet destined for the destination port, (4) a determination module that at least one characteristic of the packet satisfies at least one of the rules, and (5) a forward module that, in response to determining that the characteristic of the packet satisfies at least one of the rules, forwards a copy of the packet to a virtual tap port that analyzes the packet for security threats. In addition, the system may include at least one processor that executes the identification module, the providing module, the interception module, the determination module, and the forward module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a virtual network containing at least one virtualized switching device that routes network traffic from a source port within the virtual network to a destination port, (2) provide, within the virtualized switching device, a set of software-defined network rules containing criteria for identifying packets having at least one predetermined property associated with a security policy, (3) intercept, at the source port, a packet destined for the destination port, (4) determine that at least one characteristic of the packet satisfies at least one of the rules, and (5) in response to determining that the characteristic of the packet satisfies at least one of the rules, forward a copy of the packet to a virtual tap port that analyzes the packet for security threats.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary set of software-defined network rules.

Figure 1:
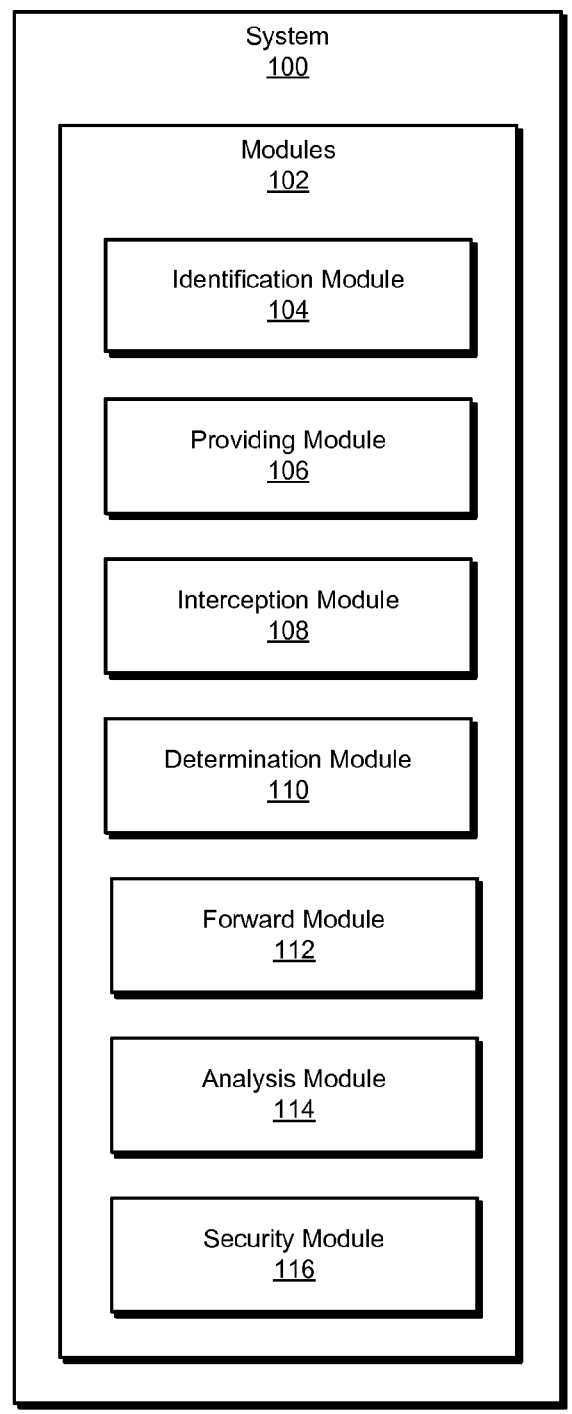
FIG. 1 is a block diagram of an exemplary system for monitoring virtual networks.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for monitoring virtual networks. As will be explained in greater detail below, by identifying (via, e.g., a set of OPENFLOW rules) packets having properties indicative of potential security threats, the systems and methods described herein may forward copies of suspicious packets to a virtual tap port to analyze the packet copies for malware attacks, data leaks, etc. In addition, by implementing a set of software-defined network rules based on any type of physical wiretap mechanism, the disclosed systems and methods may efficiently monitor virtual networks using techniques proven to be effective within physical networks. Furthermore, by implementing virtual wiretaps within portions of cloud-based computing platforms dedicated to cloud-based applications of various tenants, the systems and methods described herein may provide the tenants with granular and customizable network monitoring services.

Figure 2:
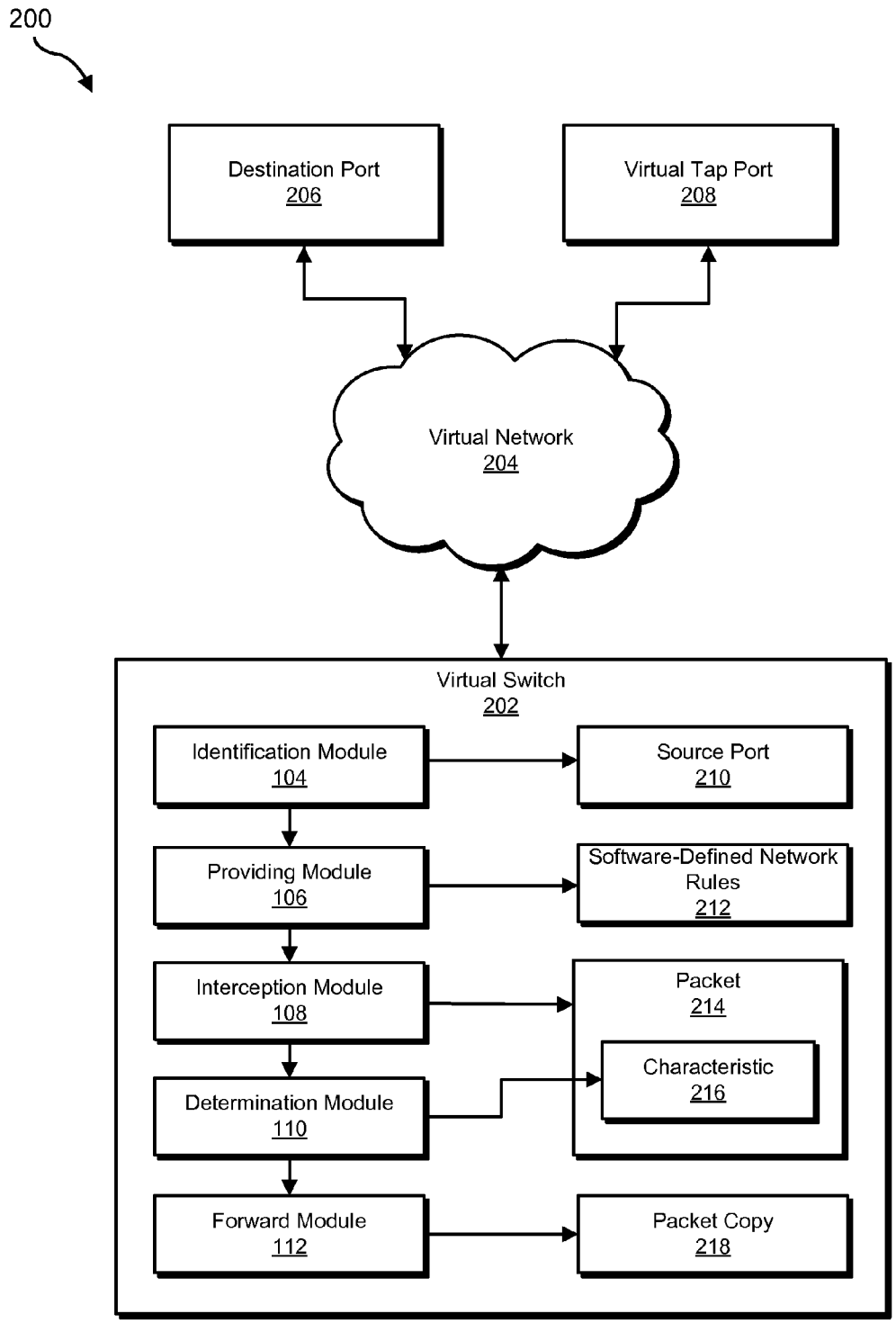
FIG. 2 is a block diagram of an additional exemplary system for monitoring virtual networks.

The following will provide, with reference to FIGS. 1 and 2, detailed descriptions of exemplary systems for monitoring virtual networks. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for monitoring virtual networks. As illustrated in this figure, exemplary system 100 may include one or more modules 102 for performing one or more tasks. For example, and as will be explained in greater detail below, exemplary system 100 may include an identification module 104 that identifies a virtual network containing at least one virtualized switching device that routes network traffic from a source port within the virtual network to a destination port. Exemplary system 100 may also include a providing module 106 that provides, within the virtualized switching device, a set of software-defined network rules containing criteria for identifying packets having at least one predetermined property associated with a security policy.

In addition, and as will be described in greater detail below, exemplary system 100 may include an interception module 108 that intercepts, at the source port, a packet destined for the destination port. Exemplary system 100 may also include a determination module 110 that determines that at least one characteristic of the packet satisfies at least one of the rules. Furthermore, exemplary system 100 may include a forward module 112 that, in response to the determination that the characteristic of the packet satisfies at least one of the rules, forwards a copy of the packet to a virtual tap port that analyzes the packet for security threats.

Moreover, exemplary system 100 may include an analysis module 114 that determines, based on an analysis of the copy of the packet at the virtual tap port, that the packet represents a security threat. Finally, exemplary system 100 may include a security module 116 that performs at least one security action in response to the determination that the packet represents the security threat. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., virtual switch 202 and/or virtual tap port 208), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a virtual switch 202 in communication with a destination port 206 and a virtual tap port 208 via a virtual network 204. In one example, virtual switch 202 may be programmed with one or more of modules 102 in order to intercept packets as they are routed to and/or from virtual switch 202. Additionally or alternatively, virtual tap port 208 may be programmed with one or more of modules 102 in order to analyze copies of packets intercepted at virtual switch 202 for security threats.

In one embodiment, one or more of modules 102 from FIG. 1 may, when executed by at least one processor of virtual switch 202, enable virtual switch 202 to monitor virtual networks. For example, and as will be described in greater detail below, identification module 104 may cause virtual switch 202 to identify a virtual network (e.g., virtual network 204) containing at least one virtualized switching device (e.g., virtual switch 202) that routes network traffic from a source port (e.g., source port 210) within virtual network 204 to a destination port (e.g., destination port 206). In addition, providing module 106 may cause virtual switch 202 to provide, within virtual switch 202, a set of software-defined network rules (e.g., software-defined network rules 212) containing criteria for identifying packets having at least one predetermined property associated with a security policy. Next, interception module 108 may cause virtual switch 202 to intercept, at source port 210, a packet (e.g., packet 214) destined for destination port 206. Furthermore, determination module 110 may cause virtual switch 202 to determine that at least one characteristic (e.g., characteristic 216) of packet 214 satisfies at least one of software-defined network rules 212. Finally, in response to the determination that characteristic 216 of packet 214 satisfies at least one of software-defined network rules 212, forward module 112 may cause virtual switch 202 to forward a copy of packet 214 (e.g., packet copy 218) to a virtual tap port (e.g., virtual tap port 208) that analyzes packet copy 218 for security threats.

Virtual switch 202 generally represents any type or form of software emulation or replication of a physical switching device. The terms "switching device" and "switch," as used herein, generally refer to any computing device capable of receiving data packets at an input port and directing packets to their intended destinations by forwarding the packets from an output port. In some examples, a switch may direct packets to and from devices connected within a Local Area Network (LAN) or other small and/or private network. In these examples, a switch may direct a packet from one computing device to another device via a LAN based on the destination Media Access Control (MAC) address of the packet. In other examples, a switch may direct packets within and/or between larger networks, such as Wide Area Networks (WANs). In these examples, a switch may analyze the Internet Protocol (IP) address of a packet in order to forward the packet to another switch that directly communicates with the destination port of the packet.

Accordingly, virtual switch 202 may represent any portion of software or executable code hosted on a physical device that receives and forwards packets based on characteristics (e.g., destination MAC addresses and/or IP addresses) of the packets. In some examples, virtual switch 202 may be hosted on a virtual machine (e.g., controlled by a hypervisor). In other examples, virtual switch 202 may represent all or a portion of a hypervisor that controls one or more applications hosted in a cloud-computing environment.

The term "virtual machine," as used herein, generally refers to any emulation or replication of a physical computing device. In some examples, a virtual machine may be configured to provide a particular service, such as hosting a certain application or simulating a network device. In addition, the term "hypervisor," as used herein, generally refers to any portion of software or executable code that manages or controls one or more virtual machines. In some examples, a hypervisor may manage multiple virtual machines that host cloud-based applications in a cloud-computing environment. The term "cloud-computing environment" as used herein, generally refers to any platform or configuration of physical or virtual devices that provides remote access to applications (e.g., cloud-based applications) or services hosted on the devices. In an exemplary embodiment, virtual switch 202 may be hosted within a cloud-computing environment to facilitate access to and/or provide security services for one or more cloud-based applications within virtual network 204.

In addition, virtual switch 202 may operate and/or connect virtual machines, hypervisors, or other switches via any one or combination of layers (e.g., L1-L7) within the Open Systems Interconnection (OSI) model. In an exemplary embodiment, virtual switch 202 may connect multiple virtual machines via L2 segments. In one example, virtual switch 202 may communicate with other virtual network devices using an L2-over-L3 overlay network.

Furthermore, in some examples, virtual switch 202 may support a software-defined network protocol, such as OPENFLOW. The term "software-defined network," as used herein, generally refers to any type or form of network that separates and/or decouples the tasks of deciding how to handle network traffic (performed by a control plane) and forwarding network traffic (performed by a data plane). As opposed to a non-software-defined network that simply forwards packet via the data plane based on decisions made by the control plane, a software-defined network may enable a user to re-direct packets based on a set of software-defined network rules.

The term "software-defined network rules," as used herein, generally refers to any set of criteria, procedures, or conditions that specify how to handle network traffic within a software-defined network. In some examples, a set of software-defined network rules may determine how to forward network traffic based on characteristics or properties of the network traffic. In one embodiment, when virtual switch 202 receives a packet, virtual switch 202 may reference a set of software-defined network rules (e.g., software-defined network rules 212) stored within virtual switch 202 to determine how to forward the packet. For example, virtual switch 202 may determine that software-defined network rules 212 indicate that the packet (or a copy of the packet) should be routed along a different path or to a different device, port, IP address, or MAC address than is specified within the packet.

In some examples, virtual switch 202 may represent an edge switch that connects input ports within virtual switch 202 to both ports within virtual network 204 and ports outside of virtual network 204. For example, all or a portion of the network traffic entering and leaving virtual network 204 may be forwarded through virtual switch 202. As such, software-defined network rules 212 within virtual switch 202 may identify all malicious or harmful packets distributed to or from virtual network 204.

Moreover, virtual switch 202 may represent or include the functionality of any one or number of switching devices. For example, virtual switch 202 may be configured to emulate a particular type of physical switching device. In other examples, virtual switch 202 may be specifically configured to manage the packet forwarding and/or security services required within a particular cloud-computing environment. Notably, in these examples, the configuration of virtual switch 202 may not map to the software or hardware configuration of any physical switch. As such, virtual switch 202 may not be capable of being monitored by any established methods for monitoring physical switching devices.

Virtual network 204 generally represents any software-based medium or architecture capable of facilitating communication or data transfer. In some examples, virtual network 204 may represent a Virtual Local Area Network (VLAN) within a cloud-computing environment. Additionally or alternatively, virtual network 204 may connect one or more virtual machines inside a hypervisor. In general, virtual network 204 may represent any software-based protocol that transfers packets to and/or from virtual switch 202.

The term "packet," as used herein, generally refers to any type or form of package or unit of formatted data that may be received at and/or distributed from a switching device. In some examples, a packet may include control information (e.g., within the header and/or footer sections of the packet) that indicates properties of the source, destination, formatting, etc. of the packet. Additionally or alternatively, a packet may include user data (e.g., within the payload section of the packet) that represents the body or message of a packet. Examples of packets include, without limitation, IP version 4 (IPv4) packets, IP version 6 (IPv6) packets, Gateway-to-Gateway Protocol (GGP) packets, OPENFLOW packets, Internet Group Message Protocol (IGMP) packets, Transmission Control Protocol (TCP) packets, combinations of one or more of the same, or any other suitable packet.

Furthermore, the term "network traffic," as used herein, generally refers to any type or form of data transfer within and/or between one or more networks. In some examples, network traffic may involve packets passing between ports of switching devices and/or other network devices. Virtual network 204 may facilitate network traffic via virtual switch 202 by delivering and/or transferring packets to and from virtual ports within virtual switch 202. The term "virtual port," as used herein, generally refers to any type or form of virtual and/or logical interface that facilitates the transfer of packets within and/or between networks (e.g., virtual networks).

Figure 3:
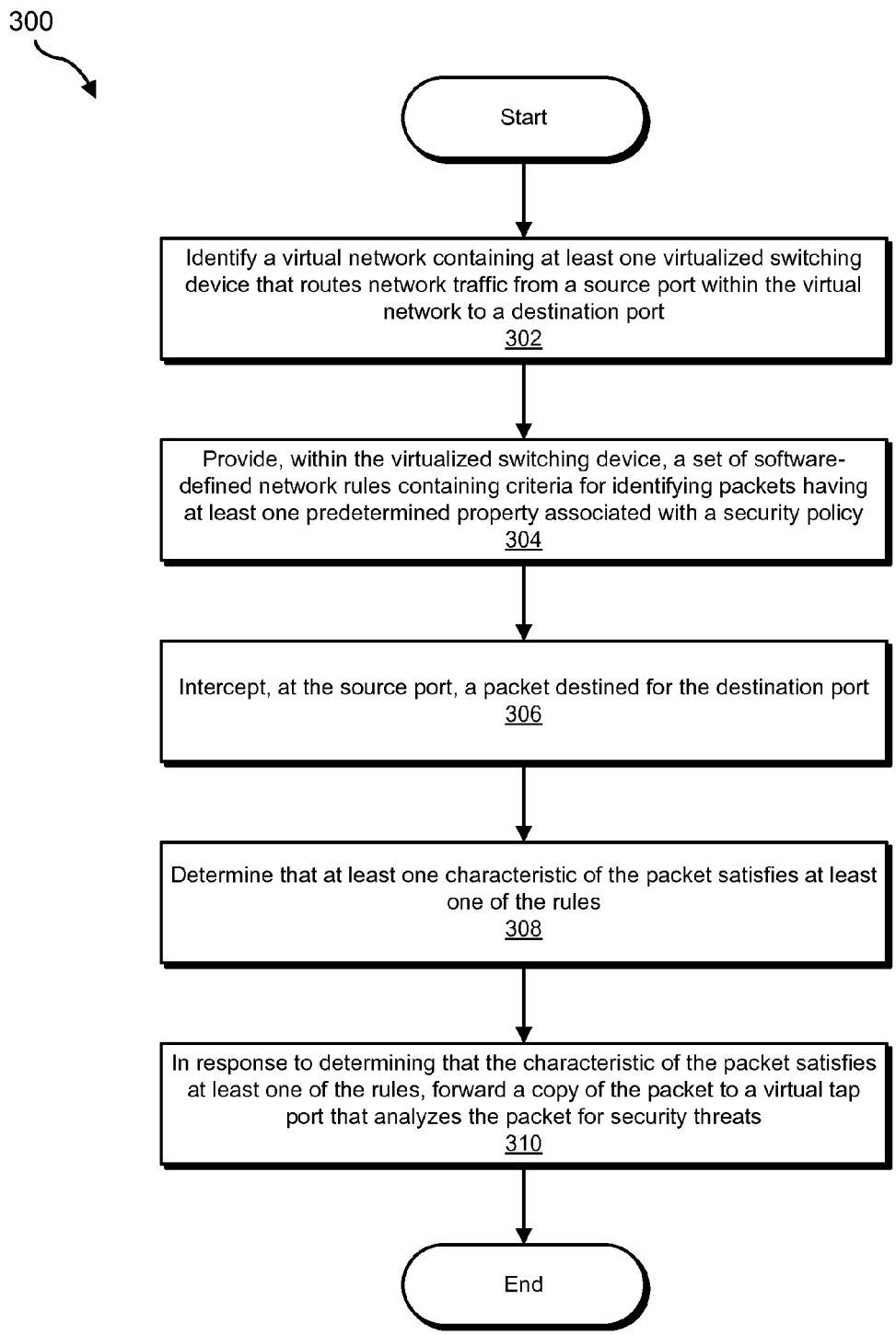
FIG. 3 is a flow diagram of an exemplary method for monitoring virtual networks.

FIG. 3 is a flow diagram of an exemplary computer-implemented method 300 for monitoring virtual networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a virtual network containing at least one virtualized switching device that routes network traffic from a source port within the virtual network to a destination port. For example, identification module 104 may, as part of virtual switch 202 in FIG. 2, identify virtual network 204 containing virtual switch 202 that routes network traffic from source port 210 within virtual network 204 to destination port 206.

The term "source port," as used herein, generally refers to any type or form of input port that receives packets at a switching device. In addition, the term "destination port," as used herein, generally refers to any type or form of port that a packet is directed towards but has not yet reached.

Figure 4:
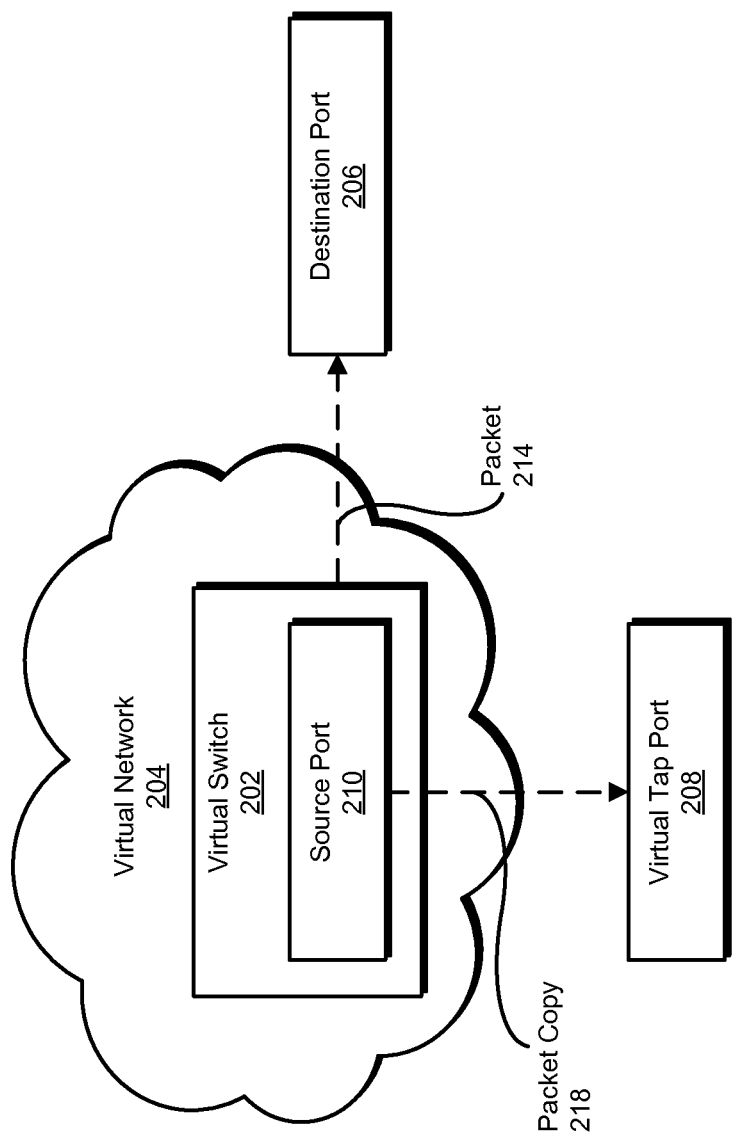
FIG. 4 is a block diagram of an exemplary configuration of a virtual switch within a virtual network.

The systems described herein may identify a virtual network containing a virtualized switching device in a variety of ways. As an example, FIG. 4 illustrates one configuration of virtual switch 202 and virtual network 204. In this example, identification module 104 may determine that source port 210 is configured to receive all or a portion of the packets sent to virtual switch 202. Although not shown in FIG. 4, virtual switch 202 may contain any number of additional input and/or output ports. In some examples, identification module 104 may determine that each port within virtual switch 202 is dedicated to handling traffic within virtual network 204. However, in other examples, identification module 104 may determine that the ports within virtual switch 202 are allocated to multiple virtual networks.

In some examples, identification module 104 may also identify the configuration of virtual network 204 in relation to additional virtual networks associated with or connected to virtual network 204 and/or virtual switch 202. For example, identification module 104 may identify virtual network 204 from within a plurality of virtual networks hosted in a cloud-computing environment. In one embodiment, virtual network 204 may represent one of multiple VLANs in a cloud-computing environment configured provide security services to multiple cloud-based applications hosted on virtual machines. In this embodiment, identification module 104 may determine that each virtual network (or each hypervisor, each virtual machine, etc.) within the cloud-computing environment is associated with and/or managed by a different enterprise or tenant.

The term "tenant," as used herein, generally refers to any type or form of entity, individual, or organization that may claim or manage all or a portion of a virtual switch (e.g., virtual switch 202), virtual network (e.g., virtual network 204), or virtual machine operating in a cloud-computing environment. In some examples, a tenant may host a cloud-based application within virtual network 204 in order to protect the cloud-based application with the security services provided by software-defined network rules 212 and/or virtual tap port 208.

Returning to FIG. 3, at step 304 one or more of the systems described herein may provide, within the virtualized switching device, a set of software-defined network rules containing criteria for identifying packets having at least one predetermined property associated with a security policy. For example, providing module 106 may, as part of virtual switch 202 in FIG. 2, provide software-defined network rules 212 within virtual switch 202.

The term "security policy," as used herein, generally refers to any type or form of rules or restrictions intended to detect and/or prevent security threats or breaches such as malware attacks, data leaks, unauthorized access to classified or sensitive information, etc. In some examples, a security policy may limit the type or quantity of information that is distributed from or sent to an enterprise, network, or application.

The systems described herein may provide a set of software-defined network rules in a variety of ways. In some examples, providing module 106 may configure software-defined network rules 212 to replicate or emulate a physical wiretap. For example, providing module 106 may generate criteria to identify network traffic distributed from certain data distribution channels (e.g., certain ports, domains, IP addresses, etc.) that a wiretap on a physical network may monitor. Additionally or alternatively, providing module 106 may configure software-defined network rules 212 with criteria specific to monitoring packets in virtual environments.

In some examples, providing module 106 may receive software-defined network rules 212 from a tenant of virtual network 204. Specifically, providing module 106 may receive a request from a tenant of virtual network 204 to generate software-defined network rules 212 based on a physical wiretap and/or a certain security policy. In one example, providing module 106 may receive a request to detect the distribution of sensitive data via emails from virtual network 204. In response to the request, providing module 106 may configure software-defined network rules 212 to identify emails distributed from all or a portion of the ports within virtual network 204 to ports outside of virtual network 204. Similarly, providing module 106 may configure software-defined network rules 212 to identify attempts to access certain servers or virtual machines within virtual network 204 based on a request to detect malicious intrusions into a cloud-based application hosted within virtual network 204.

As an example, FIG. 5 illustrates software-defined network rules 212. In this example, software-defined network rules 212 may specify particular values of properties of packets that indicate the packets should be analyzed for security threats. As shown in FIG. 5, software-defined network rules 212 may be used to identify packets with a destination MAC address of "00-16-22-01-25-43," packets with a source MAC address of "00-0B-95-9A-59-17," packets with a destination IP address of "766.11.219.55," packets with a source IP address of "54.395.196.74," and packets with a protocol type of "IPv4." In general, software-defined network rules 212 may identify packets with any number of source or destination MAC addresses or IP addresses and/or any type of protocol. Software-defined network rules 212 may also identify packets based on any additional property of the packets, such as a TCP or User Datagram Protocol (UPD) port number of the packets, a source or destination VLAN of the packets, and/or a tunnel used to route the packets between VLANs.

Providing module 106 may implement software-defined network rules 212 within virtual switch 202 in a variety of ways. In some examples, providing module 106 may apply software-defined network rules 212 to all packets received at source port 210. For example, source port 210 may be configured as a "sniffing port" within virtual switch 202. Providing module 106 may also apply software-defined network rules 212 or an additional set of software-defined network rules to any additional input ports within virtual switch 202.

As previously mentioned, virtual switch 202 may be implemented within a virtual machine, hypervisor, gateway, or any additional software-based computing platform. Providing module 106 may implement software-defined network rules 212 within the same hypervisor and/or virtual machine as virtual switch 202. Alternatively, providing module 106 may implement software-defined network rules 212 within an additional hypervisor or virtual machine (e.g., a virtual machine controlled by the hypervisor that contains virtual switch 202).

Furthermore, providing module 106 may distribute additional sets of software-defined network rules across multiple VLANs, tenants, protocols, cloud-based applications, virtual machines, etc. within the cloud-based computing environment that hosts virtual network 204. For example, providing module 106 may implement a set of software-defined network rules within each VLAN and/or each cloud-based application managed by each tenant of a cloud-based computing environment. In another example, providing module 106 may implement a set of software-defined network rules for each physical host that hosts one or more virtual switches, virtual networks, cloud-based applications, etc. In a further example, providing module 106 may implement a set of software-defined network rules for each L2 segment used to connect different virtual machines.

In general, providing module 106 may implement one or more sets of software-defined network rules (including software-defined network rules 212) within any number or configuration of hypervisors, virtual machines, VLANS, physical hosts, etc. In this way, the disclosed systems may provide flexible and granular control over the security services provided to multiple tenants within a cloud-computing environment.

Returning to FIG. 3, at step 306 one or more of the systems described herein may intercept, at the source port, a packet destined for the destination port. For example, interception module 108 may, as part of virtual switch 202 in FIG. 2, intercept, at source port 210, packet 214 destined for destination port 206.

The systems described herein may intercept the packet at the source port in a variety of ways. In some examples, interception module 108 may intercept packet 214 as packet 214 is distributed from a port, device, virtual machine, etc. within virtual network 204 to a destination outside of virtual network 204. In other examples, interception module 108 may intercept packet 214 as packet 214 is distributed from a source outside of virtual network 204 to a port, device, virtual machine, etc. within virtual network 204. Alternatively, interception module 108 may intercept packet 214 as packet 214 is being distributed within virtual network 204 (e.g., as packet 214 is sent from one port within virtual network 204 to another port within virtual network 204).

Returning to FIG. 3, at step 308 one or more of the systems described herein may determine that at least one characteristic of the packet satisfies at least one of the rules. For example, determination module 110 may, as part of virtual switch 202 in FIG. 2, determine that characteristic 216 of packet 214 satisfies at least one of software-defined network rules 212.

The systems described herein may determine that at least one characteristic of the packet satisfies at least one of the rules in a variety of ways. In some examples, determination module 110 may determine that characteristic 216 (and any additional characteristics of packet 214) satisfies one or more of software-defined network rules 212 by determining that the value of characteristic 216 matches the value of one or more properties within software-defined network rules 212.

Figure 6:
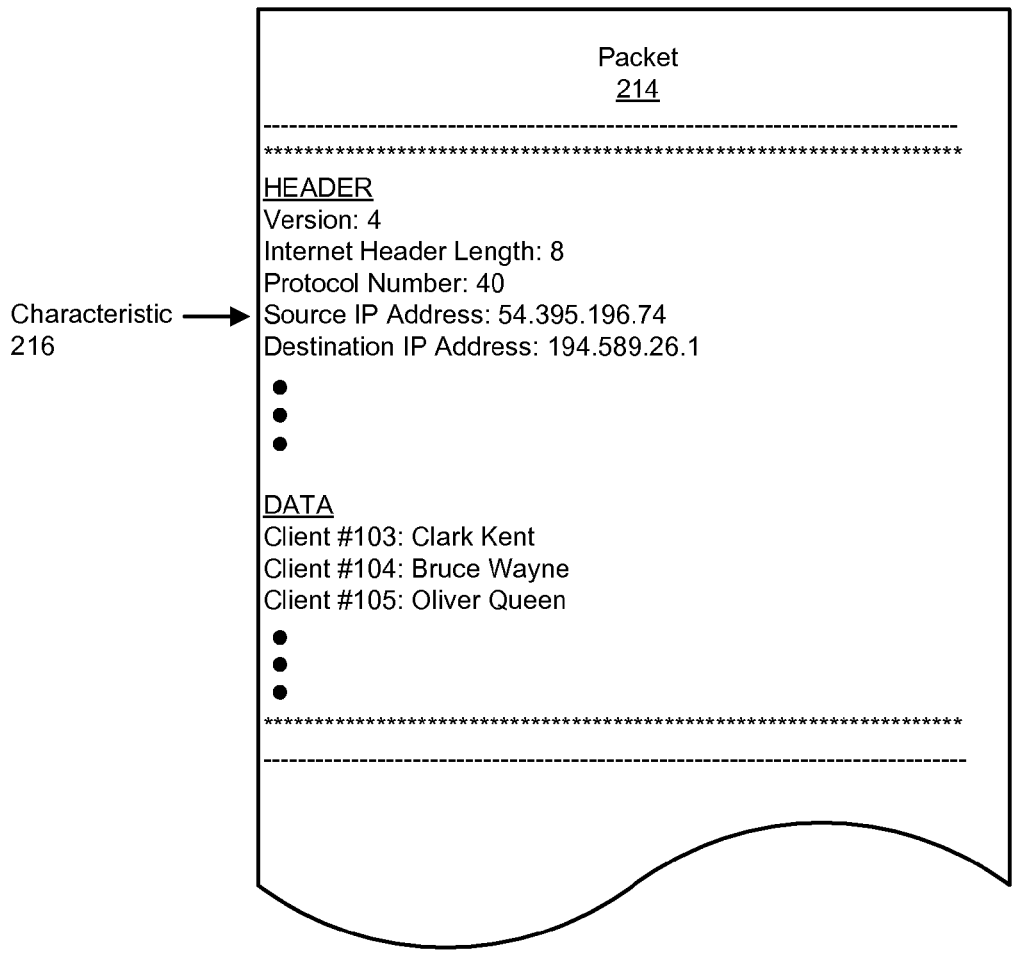
FIG. 6 is an illustration of an exemplary packet intercepted at a virtualized switching device.

As an example, FIG. 6 illustrates characteristics of packet 214. In this example, packet 214 may represent an IPv4 packet. As such, the header of packet 214 may contain a variety of standard information associated with IPv4 packets, such as the version (of IP protocol) of packet 214 (in this example, "4"), the internet header length of packet 214 (in this example, "8" words), the protocol number of packet 214 (in this example, "40"), the source IP address of packet 214 (in this example, "54.395.196.74"), and the destination IP address of packet 214 (in this example, "194.589.26.1"). Although not shown in FIG. 6, the header of packet 214 may also include the total length of packet 214, any flags associated with packet 214, a fragment offset of packet 214, a Time To Live (TTL) of packet 214, a header checksum used for error-checking the header of packet 214, and/or any additional information associated with the source, destination, formatting, etc. of packet 214. As shown in FIG. 6, packet 214 may also include a data (or payload) section. In this example, the data section of packet 214 may include a portion of a client list. Specifically, the data section of packet 214 may include "Client #103: Clark Kent," "Client #104: Bruce Wayne," and "Client #105: Oliver Queen."

In the example of FIG. 6, determination module 110 may identify the source IP address of packet 214 as characteristic 216. Referring to the example of FIG. 5, determination module 110 may determine that characteristic 216 of packet 214 matches the source IP address listed within software-defined network rules 212. Therefore, determination module 110 may determine that characteristic 216 of packet 214 satisfies the "source IP address" rule within software-defined network rules 212.

Returning to FIG. 3, at step 310 one or more of the systems described herein may, in response to determining that the characteristic of the packet satisfies at least one of the rules, forward a copy of the packet to a virtual tap port that analyzes the copy of the packet for security threats. For example, forward module 112 may, as part of virtual switch 202 in FIG. 2, forward a copy of packet 214 to virtual tap port 208 in response the determination that characteristic 216 satisfies at least one of software-defined network rules 212.

The term "virtual tap port," as used herein, generally refers to any type or form of virtual port configured to (or in communication with a server or virtual machine configured to) analyze packets (or copies of packets) for indications of security threats. In addition, the term "copy of a packet," as used herein, generally refers to any type or form of replication or imitation of a packet and/or the information within a packet. In some examples, creating a copy of a packet may not change or alter the information within the packet or the path of the packet to its destination port.

As shown in the example of FIG. 4, virtual tap port 208 may reside outside of virtual network 204. Additionally or alternatively, virtual tap port 208 may reside outside of virtual switch 202 and/or outside of a virtual machine or other virtual device managed by a tenant of virtual network 204. In general, virtual tap port 208 may be configured in any way such that virtual tap port 208 operates outside of the control of a tenant that requested monitoring of source port 210. In this way, the systems described herein may analyze packet copy 218 without requiring involvement or management from the tenant. In other words, the analysis of packet copy 218 may be invisible or transparent to the tenant. Alternatively, virtual tap port 208 may reside within virtual network 204 or may otherwise be accessible and/or visible to a tenant of virtual network 204. In this way, the tenant may actively monitor the process of analyzing packet copy 218.

Forward module 112 may forward packet copy 218 to virtual tap port 208 in a variety of ways. In some examples, forward module 112 may forward packet copy 218 to virtual tap port 208 via one or more Application Program Interfaces (APIs). For example, forward module 112 may implement, at source port 210, an API that creates and forwards packet copy 218 to virtual tap port 208 based on determining that characteristic 216 of packet 214 satisfies at least one of software-defined network rules 212.

In one embodiment, source port 210 and virtual tap port 208 may reside on separate physical hosts. In this embodiment, forward module 112 may forward packet copy 218 to virtual tap port 208 via a tunneling mechanism that encapsulates packet copy 218 at source port 210 and decapsulates packet copy 218 at virtual tap port 208. In general, forward module 112 may forward packet copy 218 to virtual tap port 208 via any type or form of software-based data transfer mechanism.

In some examples, in addition to forwarding packet copy 218 to virtual tap port 208, forward module 112 may forward packet 214 to destination port 206 (or to another switching device, port, network, etc. that may facilitate forwarding packet 214 to destination port 206). In the example of FIG. 4, forward module 112 may forward packet 214 from virtual switch 202 to destination port 206 that resides outside of virtual network 204. In other examples, forward module 112 may forward packet 214 from virtual switch 202 to destination port 206 that resides inside virtual network 204.

As previously mentioned, a physical or virtual tapping mechanism may be implemented within a data distribution channel such that it does not interfere with normal data transfer across the data distribution channel. As such, forward module 112 may facilitate forwarding packet 214 to destination port 206 to ensure that packet 214 is received at destination port 206 without alterations, delays or other interference.

In some embodiments, analysis module 114 may analyze packet copy 218 for security threats once packet copy 218 has been forwarded to virtual tap port 208. For example, analysis module 114 may compare the information within the data section of packet copy 218 with a security policy (e.g., a security policy used to generate software-defined network rules 212). As mentioned in connection with FIG. 6, packet 214 (and therefore packet copy 218) may include a portion of a client list. In one example, analysis module 114 may identify the portion of the client list within packet copy 218 and determine that the client list represents secure and/or sensitive information. Analysis module 114 may also determine, based on the source and destination IP addresses within the header of packet 214, that packet 214 distributed sensitive information to a port outside of virtual network 204 from a port within virtual network 204. Analysis module 114 may therefore determine that packet 214 represents a security threat (e.g., that packet 214 violates a DLP policy).

In some examples, security module 116 may perform at least one security action in response to the determination that packet 214 represents a security threat. For example, security module 116 may alert a tenant and/or administrator of virtual network 204 that a DLP policy was violated. Security module 116 may also tighten existing security measures and/or implement new security measures within virtual network 204. For example, security module 116 may update software-defined network rules 212 to include broader criteria for identifying potentially harmful network traffic (e.g., in order increase the probability of identifying subsequent security threats). Additionally or alternatively, security module 116 may store a record of the violation (e.g., the information that was leaked, the source of the leak, etc.) in order to identify trends of security threats. In general, security module 116 may perform any suitable security action in order to protect the integrity of information stored within or accessible by virtual network 204.

In some embodiments, the systems described herein may implement multiple virtual tap ports in order to dynamically allocate packet copies to different virtual tap ports based on current network loads. For example, providing module 106 may provide, within software-defined network rules 212 or an additional set of software-defined network rules, additional criteria for determining that the flow of packets into source port 210 or additional input ports exceeds a predetermined threshold. Providing module 106 may also provide criteria within software-defined network rules 212 that specifies how to handle packets in the event that the current network traffic load exceeds the predetermined threshold.

As an example, after providing module 106 provides the additional criteria, interception module 108 may intercept an additional packet at source port 210. Determination module 110 may then determine that at least one characteristic of the additional packet satisfies at least one of the original software-defined network rules 212. Determination module 110 may also determine, based on the additional criteria within software-defined network rules 212, that receiving the additional packet increases the current network traffic load to above a predetermined threshold (e.g., 100 packets per second). In response to the determination that the current network traffic load exceeds the predetermined threshold, forward module 112 may forward a copy of the additional packet to an additional virtual tap port instead of virtual tap port 208.

In an additional example, providing module 106 may implement criteria that automatically divides packets between two or more virtual tap ports during peak business hours. Additionally or alternatively, providing module 106 may dynamically update the criteria within software-defined network rules 212 in response to detecting certain types or frequencies of security threats. For example, in response to determining that packet copy 218 contains a malware attack, providing module 106 may update the criteria to include representations of additional wiretaps designed to detect malware attacks.

The systems and methods described herein may be implemented in a variety of ways and provide a number of advantages. As explained above, by identifying (via, e.g., a set of OPENFLOW rules) packets having properties indicative of potential security threats, the systems and methods described herein may forward copies of suspicious packets to a virtual tap port to analyze the packet copies for malware attacks, data leaks, etc. In addition, by implementing a set of software-defined network rules based on any type of physical wiretap mechanism, the disclosed systems and methods may efficiently monitor virtual networks using techniques proven to be effective within physical networks. Furthermore, by implementing virtual wiretaps within portions of cloud-based computing platforms dedicated to cloud-based applications of various tenants, the systems and methods described herein may provide the tenants with granular and customizable network monitoring services.

Figure 7:
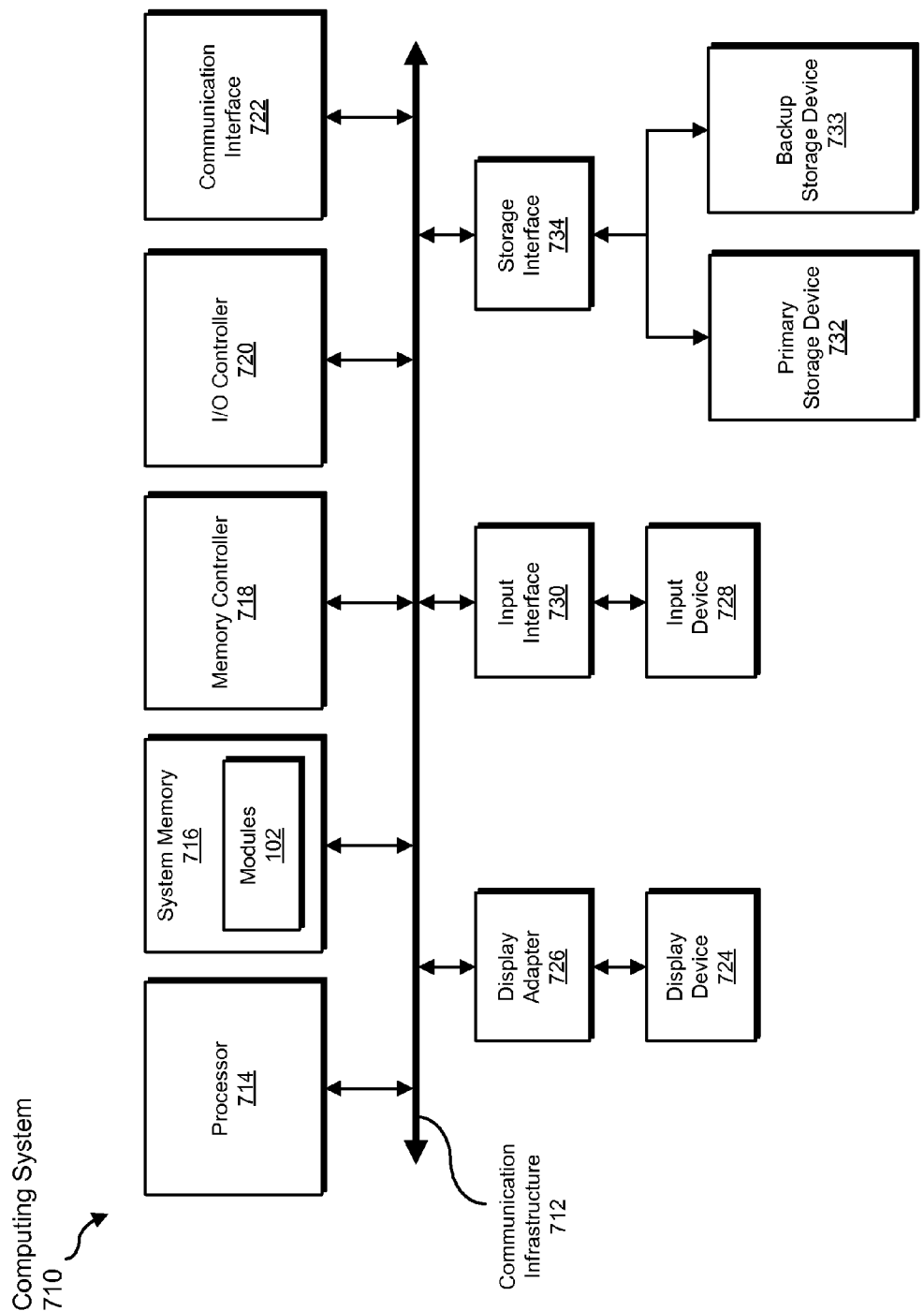
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
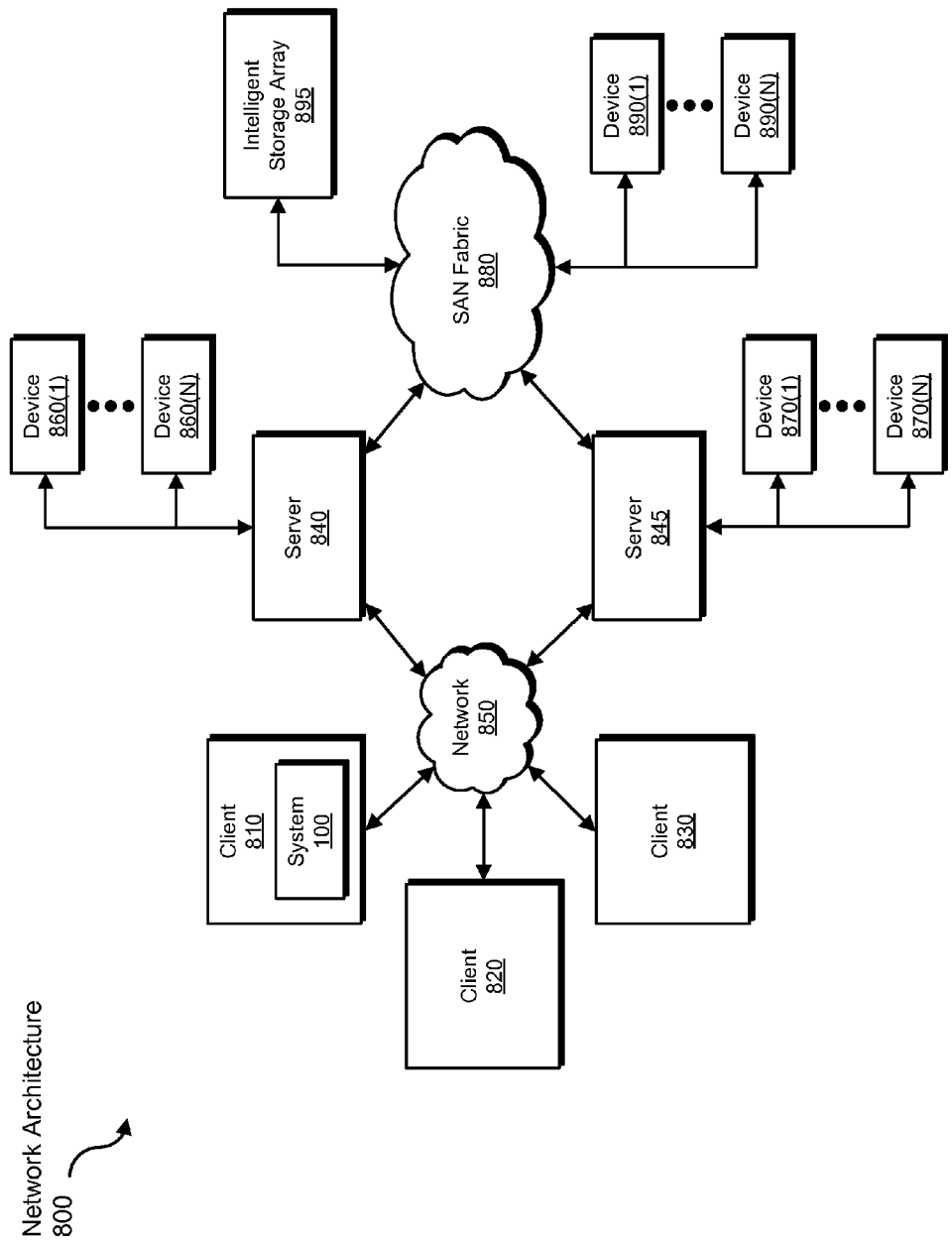
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for monitoring virtual networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a packet to be transformed, transform the packet, output a result of the transformation to a virtual tap port, use the result of the transformation to detect security threats, and store the result of the transformation to a storage or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for monitoring virtual networks, at least a portion of the method being performed by a computing device comprising at least one processor, the method comprising:
    identifying, within a cloud-computing environment that hosts a plurality of virtual networks, a virtual network comprising at least one virtualized edge switching device that handles, using a software-defined network protocol, all packets passed between the virtual network and at least one additional virtual network within the cloud-computing environment;
    emulating a physical wiretap within the virtualized edge switching device by:
        identifying characteristics of the physical wiretap that enable the physical wiretap to filter packets; and
        providing, within the virtualized edge switching device, a set of software-defined network rules based on the characteristics of the physical wiretap and containing criteria for identifying packets having at least one predetermined property associated with a security policy that:
            is defined by a tenant of the virtual network; and
            comprises a data loss prevention policy applied to packets distributed from a source port of the virtualized edge switching device to outside the virtual network;
    intercepting, at the source port of the virtualized edge switching device, a packet destined for a destination port that resides outside of the virtual network;
    determining that at least one characteristic of the packet satisfies at least one of the software-defined network rules; and in response to determining that the characteristic of the packet satisfies at least one of the software-defined network rules:
creating a copy of the packet;
forwarding, via a tunneling mechanism, the copy of the packet to a virtual tap port that is located outside of the virtual network and performs a security analysis on the copy of the packet that is invisible to the tenant of the virtual network, wherein the tunneling mechanism encapsulates the copy of the packet at the source port and decapsulates the copy of the packet at the destination port; and
forwarding the packet to the destination port along an intended network path of the packet.

2. The method of claim 1, wherein the tenant of the virtual network:
utilizes the virtual network to host a cloud-based application; and
requests that the virtualized edge switching device monitor packets passed between the cloud-based application and the additional virtual network.

3. The method of claim 1, wherein the predetermined property associated with the security policy comprises at least one of:
a property of a destination of the packets;
a property of a source of the packets; and
a property of a protocol used to route the packets.

4. The method of claim 1, wherein the virtualized edge switching device connects the source port to both additional ports within the virtual network and to ports outside the virtual network.

5. The method of claim 4, wherein:
the security policy further comprises a malware detection policy applied to network traffic distributed from outside the virtual network to an additional destination port that resides within the virtual network.

6. The method of claim 1, wherein the virtual tap port is outside of the control of the tenant of the virtual network.

7. The method of claim 1, further comprising:
determining, based on an analysis of the copy of the packet at the virtual tap port, that the packet comprises a security threat; and
performing at least one security action in response to determining that the packet comprises the security threat.

8. The method of claim 1, further comprising:
intercepting, at the source port, an additional packet that contains at least one property that satisfies at least one of the software-defined network rules;
determining, based on additional criteria within the set of software-defined network rules, that a current network traffic load within the virtual network exceeds a predetermined threshold; and
in response to determining that the current network traffic load exceeds the predetermined threshold, forwarding a copy of the additional packet to an additional virtual tap port instead of the virtual tap port.

9. A system for monitoring virtual networks, the system comprising:
an identification module, stored in memory, that identifies, within a cloud-computing environment that hosts a plurality of virtual networks, a virtual network comprising at least one virtualized edge switching device that handles, using a software-defined network protocol, all packets passed between the virtual network and at least one additional virtual network within the cloud-computing environment;
a providing module, stored in the memory, that emulates a physical wiretap within the virtualized edge switching device by:
identifying characteristics of the physical wiretap that enable the physical wiretap to filter packets; and
providing, within the virtualized edge switching device, a set of software-defined network rules based on the characteristics of the physical wiretap and containing criteria for identifying packets having at least one predetermined property associated with a security policy that:
is defined by a tenant of the virtual network; and
comprises a data loss prevention policy applied to packets distributed from a source port of the virtualized edge switching device to outside the virtual network;
an interception module, stored in the memory, that intercepts, at the source port of the virtualized edge switching device, a packet destined for a destination port that resides outside of the virtual network;
a determination module, stored in the memory, that determines that at least one characteristic of the packet satisfies at least one of the software-defined network rules;
a forward module, stored in the memory, that in response to determining that the characteristic of the packet satisfies at least one of the software-defined network rules:
creates a copy of the packet;
forwards, via a tunneling mechanism, the copy of the packet to a virtual tap port that is located outside of the virtual network and performs a security analysis on the copy of the packet that is invisible to the tenant of the virtual network, wherein the tunneling mechanism encapsulates the copy of the packet at the source port and decapsulates the copy of the packet at the destination port; and
forwards the packet to the destination port along an intended network path of the packet; and
at least one hardware processor that executes the identification module, the providing module, the interception module, the determination module, and the forward module.

10. The system of claim 9, wherein the tenant of the virtual network:
utilizes the virtual network to host a cloud-based application; and
requests that the virtualized edge switching device monitor packets passed between the cloud-based application and the additional virtual network.

11. The system of claim 9, wherein the predetermined property associated with the security policy comprises at least one of:
a property of a destination of the packets;
a property of a source of the packets; and
a property of a protocol used to route the packets.

12. The system of claim 9, wherein the virtualized edge switching device connects the source port to both additional ports within the virtual network and to ports outside the virtual network.

13. The system of claim 12, wherein:
the security policy further comprises a malware detection policy applied to network traffic distributed from outside the virtual network to an additional destination port that resides within the virtual network.

14. The system of claim 9, wherein the virtual tap port is outside of the control of the tenant of the virtual network.

15. The system of claim 9, further comprising:

an analysis module that determines, based on an analysis of the copy of the packet at the virtual tap port, that the packet comprises a security threat; and a security module that performs at least one security action in response to the determination that the packet comprises the security threat.

16. The system of claim 9, wherein:

the interception module intercepts, at the source port, an additional packet that contains at least one property that satisfies at least one of the software-defined network rules;

the determination module determines, based on additional criteria within the set of software-defined network rules, that a current network traffic load within the virtual network exceeds a predetermined threshold; and in response to the determination that the current network traffic load exceeds the predetermined threshold, the forward module forwards a copy of the additional packet to an additional virtual tap port instead of the virtual tap port.

17. A non-transitory computer-readable medium comprising one or more computer-readable instructions that, when executed by at least one processor of a computing device, cause the computing device to:

identify, within a cloud-computing environment that hosts a plurality of virtual networks, a virtual network comprising at least one virtualized edge switching device that handles, using a software-defined network protocol, all packets passed between the virtual network and at least one additional virtual network within the cloud-computing environment;

emulate a physical wiretap within the virtualized edge switching device by:

identifying characteristics of the physical wiretap that enable the physical wiretap to filter packets; and providing, within the virtualized edge switching device, a set of software-defined network rules based on the characteristics of the physical wiretap and containing criteria for identifying packets having at least one predetermined property associated with a security policy that:

is defined by a tenant of the virtual network; and comprises a data loss prevention policy applied to packets distributed from a source port of the virtualized edge switching device to outside the virtual network;

intercept, at a source port of the virtualized edge switching device, a packet destined for a destination port that resides outside of the virtual network;

determine that at least one characteristic of the packet satisfies at least one of the software-defined network rules; and in response to determining that the characteristic of the packet satisfies at least one of the software-defined network rules:

create a copy of the packet;

forward, via a tunneling mechanism, the copy of the packet to a virtual tap port that is located outside of the virtual network and performs a security analysis on the copy of the packet that is invisible to the tenant of the virtual network, wherein the tunneling mechanism encapsulates the copy of the packet at the source port and decapsulates the copy of the packet at the destination port; and forward the packet to the destination port along an intended network path of the packet.

18. The non-transitory computer-readable medium of claim 17, wherein the tenant of the virtual network:

utilizes the virtual network to host a cloud-based application; and requests that the virtualized edge switching device monitor packets passed between the cloud-based application and the additional virtual network.

* * * * *